Figure 1:
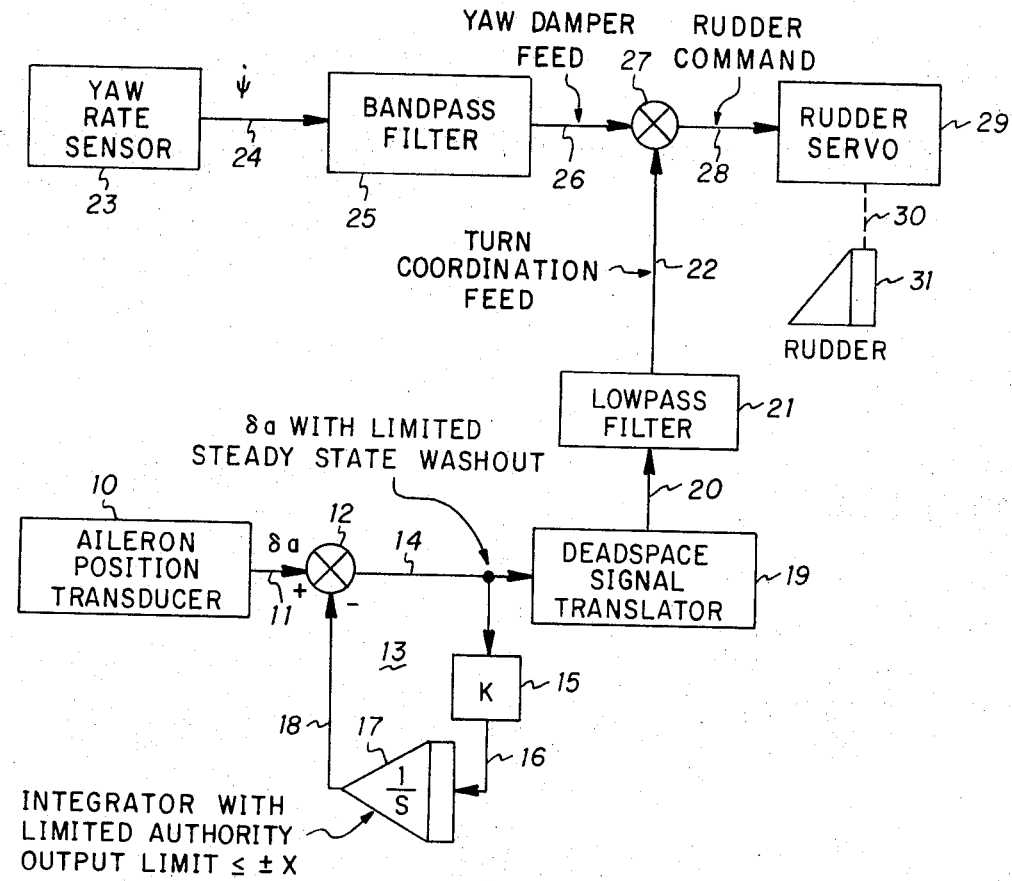

United States Patent [19]
Tribuno et al.

[11] 3,777,242
[45] Dec. 4, 1973

[54] TURN COORDINATION CONTROL WITH DEAD SPACE AND LIMITED WASHOUT

[75] Inventors: Robert F. Tribuno; Thomas E. Foster, both of Santa Monica, Calif.; David W. Mineck, Cedar Rapids, Iowa; Edwin R. Hattendorf, Mission Viejo, Calif.

[73] Assignee: Collins Radio Company, Dallas, Tex.

[22] Filed: Dec. 21, 1972

[21] Appl. No.: 317,472

[52] U.S. Cl................................. 318/586, 244/77 DZ
[51] Int. Cl. .............................................. G05b 11/01
[58] Field of Search................... 318/586; 244/77 E, 244/77 DZ

[56] References Cited
UNITED STATES PATENTS

| | | | |
|---|---|---|---|
| 3,275,268 | 9/1966 | Auld, Jr. .......................... | 318/586 X |
| 3,454,851 | 7/1969 | Kirchhein ........................ | 318/586 X |
| 3,604,907 | 9/1971 | Wesner............................ | 318/586 X |
| 3,517,285 | 6/1970 | Kundler........................... | 244/77 DZ |
| 3,568,960 | 3/1971 | Griffith............................ | 244/77 DZ |

*Primary Examiner*—B. Dobeck
*Attorney*—Richard W. Anderson et al.

[57] ABSTRACT

A turn coordination feed which, unlike conventional linear control operates on a combined zero-linear coordination basis. Small aileron position input signals are precluded from the coordination function and those exceeding a predetermined threshold are utilized in normal linear coordination control. An amplitude related limited washout and dead space translator coact to permit desired low threshold uncoordinated maneuver while maintaining steady state washout of airleron position signals.

5 Claims, 2 Drawing Figures

TURN COORDINATION CONTROL WITH DEAD SPACE AND LIMITED WASHOUT

This invention relates generally to yaw axis stabilization to automatic control systems for aircraft and more particularly to an improved turn coordination system to compensate for adverse yaw moments induced during bank maneuvers.

The employment of rudder for turn coordination during aircraft banking maneuvers has long been practiced. The coordination is known to be desirable, since, for example, when an aircraft is banked left, the aircraft tends to yaw to the right, due to an aileron-induced moment about the yaw axis. The yaw axis moment induced during a left bank is counteracted by the application of left rudder for a coordinated (ball-centered) turn.

Known conventional turn coordination systems operate under linear aileron coordination control laws, wherein aileron position is mixed with a yaw damper feed stemming from a yaw rate sensor to develop a rudder command to accomplish the turn coorindation. Several stability problems are associated with conventional linear aileron coordination control laws, among which are adversely introduced standoff errors associated with the aileron transducer, the inability to perform desired miscoordinated maneuvers under certain circumstances, the inability of utilizing small aileron trim inputs without disturbing the yaw axis and requiring an immediate rudder retrim, and increased pilot workload during conditions of lateral turbulence due to the inter-reaction between aileron corrective maneuvers and related yaw axis disturbances.

Accordingly, the object of the present invention is to provide an improved aileron coordination system to permit desired miscoordinated maneuvers while providing desired yaw stability.

The present invention is featured in the provisions of a non-linear turn coordination system (as opposed to conventional linear turn coordination systems) which provides normal linear coordination for large aileron inputs and provides no coordination for small aileron inputs about zero.

The present invention is featured in the inclusion, in the turn coordination feed signal development means of a yaw stability augmentation system, of a limited dead-space signal translating means and limited signal washout means in the aileron position feed channel in a manner permitting washout of long-term standoffs such that they do not induce rudder mis-trim, and in applying aileron position signal as a turn coordination feed in the stability augmentation system only when the position signals are in excess of predetermined magnitude.

The type of performance to be described will be seen to provide significantly improved turn coordination control for several reasons:

1. Pilot workload is reduced in lateral turbulence. The dead space permits rolling gusts, which cause a wing to drop, to be counteracted with aileron without simultaneously disturbing the yaw axis.

2. Pilot workload is reduced when tracking a radio beam. Small displacements from beam center line are more easily corrected by side slipping rather than by coordinated maneuvering. The dead space allows the pilot to side slip (a miscoordinated maneuver) without being opposed by the coordination feed.

3. Undesirable interaction between the coordination feed of the yaw stability augmentation system and an autopilot with which it is associated is alleviated. While typically aileron cross feed introduces undesirable coupling with the autopilot control and reduces, thereby, overall system stability, the dead space provided by the present invention reduces this coupling and thereby improves stability.

4. Trimming of the aircraft in aileron is facilitated. The dead space provided allows the insertion of small aileron trim inputs without disturbing the yaw axis without requiring an immediate retrimming in rudder.

5. Standoffs in aileron (due to rigging errors, aileron transducer null errors, steady state aileron trim requirements, etc.), do not introduce rudder mistrim. The washout provided by the present invention prevents these nuisance aileron inputs from propagating, in the steady state, through the coordination feed to the rudder servo. The limit on the washout provided by the present invention prevents the filter associated therewith from charging excessively in a turn when, typically, outside aileron is held for a relatively long time. As will be further described such excessive charging might, in the absence of a washout limit, result in a rudder tail being adversely experienced upon roll out from a long turn maneuver.

Figure 2:
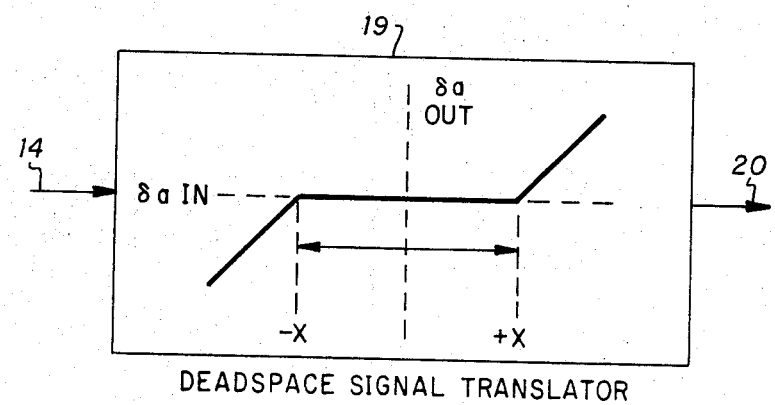

These and other features and objects of the present invention will become apparent upon reading the following descriptions with reference to the accompanying drawings in which:

FIG. 1 is a functional block diagram of an improved nonlinear turn coordination control system in accordance with the present invention; and FIG. 2 is a diagrammatic representation of the transfer characteristic of a dead space signal translator such as employed in the system of FIG. 1.

The coordination aileron feed in accordance with the present invention, as it might be employed in conjunction with a yaw damper as a part of a yaw stability augmentation system, is depicted functional in FIG. 1. Generally, a yaw damper feed 26 and a turn coordination feed 22 are applied to an output signal combining means 27 from which a rudder command 28 is applied to a rudder servo 29 to position through drive means 30, the aircraft rudder 31. The yaw damper feed 26 might conventionally be formulated from the application of yaw rate signal 24 from a yaw rate sensor 23 through a bandpass filter 25 to the output signal combining means.

The turn coordination feed 22 to the combining means 27 comprises an aileron position signal which, unlike that in conventional linear systems, is particularly processed in a nonlinear manner. Thus an aileron position transducer 10 provides an aileron position signal 11 which is not directly applied to the rudder command mix but rather is applied first through a washout loop generally designated by reference numeral 13. The washout loop 13 is comprised of a signal combining means 12 to which the aileron position signal 11 is applied as a first input. The output from signal combining means 12 is applied through a gain function 15 as input 16 to a signal integrator 17. The output 18 from integrator 17 is applied as a second subtractive input to signal combining means 12.

As indicated in FIG. 1, integrator 17 in the washout loop 13 has limited authority. Output 18 from limiter 17 is limited at a magnitude less than and not exceeding the magnitude X, where X is a predetermined signal amplitude.

Loop 13 then functions in a conventional washout loop manner to provide an integrator output 18 equal to the aileron position input signal 11, and the output 14 from mixer 12 is zero in the long term, steady state condition. This zero output for steady state input signals 11 from aileron position transducer is held for all steady state aileron position input signals 11 the magnitudes of which are less than the limit of integrator 17.

Loop 13, since it has a long time constant, therefore functions to washout aileron position transducer inputs 11 which stem from aileron standoffs due to rigging errors, transducer null errors, etc. Due to the long time constant of the integrating functions in the loop 13, the output 14 follows variations in the aileron transducer input 11 which are not long term, steady state terms.

The output 14 from the washout loop 13 is then comprised of an aileron position signal $\epsilon a$ having a limited steady state washout associated therewith. The loop output 14 is applied to a dead space signal translator 19. The output 20 from translator 19 is applied to a low pass filtering means 21, the output 22 of which comprises the turn coordination feed to the output signal combining means 27.

With reference to FIG. 2, the transfer function of the dead space signal translator 19 of FIG. 1 is seen to provide zero output for aileron position transducer inputs (with steady state turn washout) up to the predetermined signal amplitude X. For input signals in excess of the dead space threshold X, the translator 19 provides a conventional linear output. It may further be noted that the $\pm X$ dead zone defined by the dead space signal translator 19 correlates with the maximum permissible output limit imposed on integrator 17 in the washout loop. That is, the output limit of integrator 17 in the loop 13 is chosen to be less than or equal to the dead space value. Accordingly, any outputs 14 from signal combining means 12 in the washout loop having magnitudes of less than the value X will fall within the dead zone of the signal translator 19 and will not be passed. Conversely, only those outputs 14 from the washout loop in excess of the dead zone defined amplitude X will pass through dead space signal translator 19.

In operation, steady state aileron position input signals 11, such as those due to standoffs existing in this input signal, are washed out on a long term basis due to a signal cancellation within signal combining means 12. On a short time basis, variations in aileron position transducer output 11 appear at the output 14 of the washout loop and are applied to the dead space signal translator 19.

Dead space signal translator 19 might comprise a signal amplifying means, for example, wherein the output 20 from the translator is held at zero until the input thereto reaches a predetermined threshold. In FIG. 2 this threshold has been designated as $\pm X$. Accordingly, as long as the aileron position signals 11 are less in amplitude than the dead space defined for translator 19, that is less than $\pm X$, no output appears from the translator 19 and no aileron coordination is effected. The above enumerated features of the invention outline the advantages thus provided in effecting zero turn coordination feed for small aileron position input signals.

Aileron position input signals 11 in excess of $\pm X$ are passed through dead space signal translator 19 on a linear basis as depicted in the transfer characteristic of FIG. 2, and thus for relatively large aileron inputs, normal linear turn coordination is provided.

Because on a long term basis the washout loop 13, due to its non-infinite time constant to effect the washout, tends to look at aileron position input signal during an aircraft turn maneuver as a standoff, this operational feature would have an attendant disadvantage (in the absence of some compensation therefor) in developing an adverse rudder position signal 22 for application to the output signal mix when the aircraft rolls out to wings level attitude at the completion of a long turn. Should the integrator 17 within the washout loop be allowed to charge to a relatively large aileron position loop input signal during a sustained turn (aileron being held for a considerable period of time), at the completion of the turn where aileron position input signal is reduced to zero, the washout loop per se would provide an adverse aileron position input to the output signal mix if the magnitude of the signal stored in the integrator 17 exceeded the dead space function provided by signal translator 19. For this reason integrator 17 in the washout loop is provided with a limit to prevent it from charging under any circumstances to a value in excess of the dead zone amplitude defined by signal translator 19. Thus the false aileron position signal which might otherwise be applied to the output signal mix at roll out after a turn maneuver is precluded from reaching the output signal mix due to the action of the dead zone signal translator.

The limit imposed upon the integrator 17 in the washout loop 13 and the dead zone width provided by signal translator 19 thus collectively permit the desired operational characteristic of effecting washout of long term standoff errors while preventing the adverse effect that stored aileron position signal during a turn would have upon completion of the turn maneuver.

Aileron position signals in excess of the dead zone are linearly applied through low pass filter 21 to the output signal mix in signal comparison means 27. Low pass filter 21 may have a derived transfer function so as to provide an optimum transfer characteristic to effect maximum coordination. This function would include the suppression of noise and the quieting down of aileron position feed in general, while maximizing coordination capability for a particular aircraft.

The present invention thus provides a non-linear turn coordination control signal development by uniquely combining the features of zero coordination for small aileron position inputs and linear coordination for aileron position inputs in excess of a predetermined magnitude. The inclusion of a washout feature with a washout limit related to the transfer characteristic of dead zone translator employed in the signal path permits the advantages of stand-off washout with the preclusion of the development of adverse rudder at roll out following a long turn maneuver.

The present invention thus provides with a minimum of circuitry a turn coordination system permitting desired miscoordinated maneuvers under certain conditions and by means of which pilot work load is accordingly appreciably reduced.

Although the present invention has been defined with respect to a particular embodiment thereof, it is not to be so limited as changes might be made therein which fall within the scope of the invention as defined in the appended claims.

We claim:

1. Means for developing a non-linear turn coordination signal feed to an aircraft yaw stability augmentation system, comprising a signal source proportional to aircraft aileron position, steady state signal washout means receiving said aileron position signal and washing out steady state signal components thereof up to a predetermined washout limit, dead space signal translating means receiving the output of said signal washout means, said dead space signal translating means having a predetermined dead zone the width of which is at least as great as said washout limit, and the output of said dead space signal translating means comprising said turn coordination signal.

2. Signal developing means as defined in claim 1 wherein said signal washout means comprises a signal combining means the output of which is applied to the input of said dead space signal translating means, a signal inregrating means receiving the output of said signal combining means, said aileron position input signal and the output signal from integrating signal integrating means being applied as respective mutually subtractive inputs to said signal combining means, and said signal integrating means output being limited to a predetermined output level corresponding to said washout limit.

3. Signal developing means as defined in claim 1 wherein said yaw stability augmentation system comprises a signal source proportional to aircraft yaw rate, and further signal combining means receiving said yaw rate and turn coordination signals as respective inputs thereto and providing a rudder position command output signal.

4. Signal developing means as defined in claim 2 wherein said yaw stability augmentation system comprises a signal source proportional to aircraft yaw rate, and further signal combining means receiving said yaw rate and turn coordination signals as respective inputs thereto and providing a rudder position command output signal.

5. Signal developing means as defined in claim 4 wherein said signal integrating means is provided with a time constant of predetermined sufficient length to effect washout of said steady state components of the aileron position signal applied thereto and to render said integrating means insufficiently responsive to effect washout of aileron position input signals thereto exclusive of said steady state components thereof.

* * * * *

UNITED STATES PATENT OFFICE
CERTIFICATE OF CORRECTION

Patent No. 3,777,242                Dated December 4, 1973

Inventor(s) Robert F. Tribuno, et al

It is certified that error appears in the above-identified patent and that said Letters Patent are hereby corrected as shown below:

Claim 2, Column 5, line 21 after "from" delete "integrating" and substitute therefor --said--.

Signed and sealed this 16th day of April 1974.

(SEAL)
Attest:

EDWARD M. FLETCHER, JR.
Attesting Officer

C. MARSHALL DANN
Commissioner of Patents